(12) United States Patent
Lin (10) Patent No.: US 9,310,854 B2
(45) Date of Patent: Apr. 12, 2016

(54) STRUCTURE OF SCREW-FREE ADAPTATION RACK

(71) Applicant: CREMAX TECH CO., LTD., New Taipei (TW)

(72) Inventor: Chien-Chung Lin, New Taipei (TW)

(73) Assignee: CREMAX TECH CO., LTD., New Taipei (TW)

( * ) Notice: Subject to any disclaimer, the term of this patent is extended or adjusted under 35 U.S.C. 154(b) by 241 days.

(21) Appl. No.: 14/067,967

(22) Filed: Oct. 31, 2013

(65) Prior Publication Data

US 2015/0116922 A1  Apr. 30, 2015

(51) Int. Cl.
*G06F 1/18* (2006.01)
*G11B 33/12* (2006.01)

(52) U.S. Cl.
CPC ............... *G06F 1/187* (2013.01); *G06F 1/183* (2013.01); *G11B 33/123* (2013.01); *G11B 33/124* (2013.01)

(58) Field of Classification Search
CPC .... G11B 33/124; G11B 33/123; G11B 33/12; G06F 1/187; G06F 1/183
See application file for complete search history.

(56) References Cited

U.S. PATENT DOCUMENTS

| | | | | |
|---|---|---|---|---|
| 5,768,097 A * | 6/1998 | Jelinger | ................... | G06F 1/181 312/223.2 |
| 6,324,062 B1 * | 11/2001 | Treiber | ................... | G06F 1/181 312/223.2 |
| 6,731,508 B2 * | 5/2004 | Chen | ................... | G06F 1/181 361/679.33 |
| 7,190,575 B1 * | 3/2007 | Baik | ................... | G06F 1/187 248/682 |
| 8,111,509 B2 * | 2/2012 | Lee | ................... | G06F 1/181 211/26 |
| 2007/0127202 A1 * | 6/2007 | Scicluna | ................... | G06F 1/184 361/679.37 |
| 2007/0162915 A1 * | 7/2007 | Hong | ................... | G11B 33/12 720/601 |
| 2007/0195497 A1 * | 8/2007 | Atkins | ................... | G11B 33/12 361/679.33 |
| 2008/0024046 A1 * | 1/2008 | Juan | ................... | G11B 33/12 312/332.1 |
| 2008/0172527 A1 * | 7/2008 | Hsu | ................... | G06F 1/187 711/114 |
| 2008/0309208 A1 * | 12/2008 | Sherrod | ................... | G06F 1/183 312/223.2 |
| 2010/0079936 A1 * | 4/2010 | Bridges | ................... | G11B 33/126 361/679.02 |
| 2010/0097912 A1 * | 4/2010 | Lin | ................... | G11B 33/124 369/75.11 |
| 2010/0163698 A1 * | 7/2010 | Yeh | ................... | G11B 33/123 248/220.31 |
| 2011/0155871 A1 * | 6/2011 | Li | ................... | G06F 1/187 248/201 |
| 2012/0327587 A1 * | 12/2012 | Yang | ................... | G06F 1/187 361/679.39 |
| 2013/0020453 A1 * | 1/2013 | Ting | ................... | G06F 1/187 248/220.21 |
| 2013/0070414 A1 * | 3/2013 | Zhang | ................... | G06F 1/187 361/679.33 |
| 2013/0099639 A1 * | 4/2013 | Hu | ................... | G11B 33/124 312/223.2 |
| 2013/0148287 A1 * | 6/2013 | Chang | ................... | G11B 33/124 361/679.33 |
| 2013/0160372 A1 * | 6/2013 | Chen | ................... | G06F 1/181 49/386 |
| 2014/0016260 A1 * | 1/2014 | Chang | ................... | G06F 1/16 361/679.32 |

* cited by examiner

*Primary Examiner* — Hoa C Nguyen
*Assistant Examiner* — Keith Depew
(74) *Attorney, Agent, or Firm* — Leong C. Lei (57) ABSTRACT

The present invention relates to a structure of a screw-free adaptation rack, which includes a main casing including a carrying section to define an upper portion of the main casing as a primary accommodation space and a lower portion as a secondary accommodation space. A partition plate is arranged in the primary accommodation space for division into a first receiving space and a second receiving space. A retention mechanism retains at least one 2.5-inch hard drive in the primary accommodation space. The secondary accommodation space has two sidewalls with a pair of bumps and a pair of through apertures formed therein so that with position adjustment of a retained object, the bumps are fit into and thus retain the retained object, allowing the present invention to readily receive and retain a hard drive and a 3.5-inch floppy disk drive in a screw-free manner for extensive applications to various specifications.

3 Claims, 10 Drawing Sheets

PRIOR ART

FIG. 5

STRUCTURE OF SCREW-FREE ADAPTATION RACK

TECHNICAL FIELD OF THE INVENTION

The present invention generally relates to a structure of a screw-free adaptation rack, and more particularly to one that comprises a casing dividable into various use spaces to receive corresponding devices to be mounted in the casing in a screw-free manner in order to achieve the overall space of use of the present invention being available for extensively accommodating various devices therein in a manner of being easy to replace and use.

DESCRIPTION OF THE PRIOR ART

General desktop computers often include various devices and components, among which the most important ones include data storage devices. Since 1984 to before 2000, it was common for the computers to be equipped with a floppy disk (FD) drive. However, the floppy disk drive has a limited storage capacity of only 1.44 megabytes (MBs). With the progress of technology and science, data storage technology has been greatly improved and compact discs (CDs) and blue-ray discs (BDs) have been developed so that the storage capacity has been increased from hundreds of megabytes to hundreds gigabytes (GBs). The conventional storage devices are often installed in a 5.25" expansion slot inside a computer enclosure. With the use of floppy disk drives declining, the computer enclosures that are currently available have been subjected to change into models that include only 5.25" expansion slots.

Figure 5:
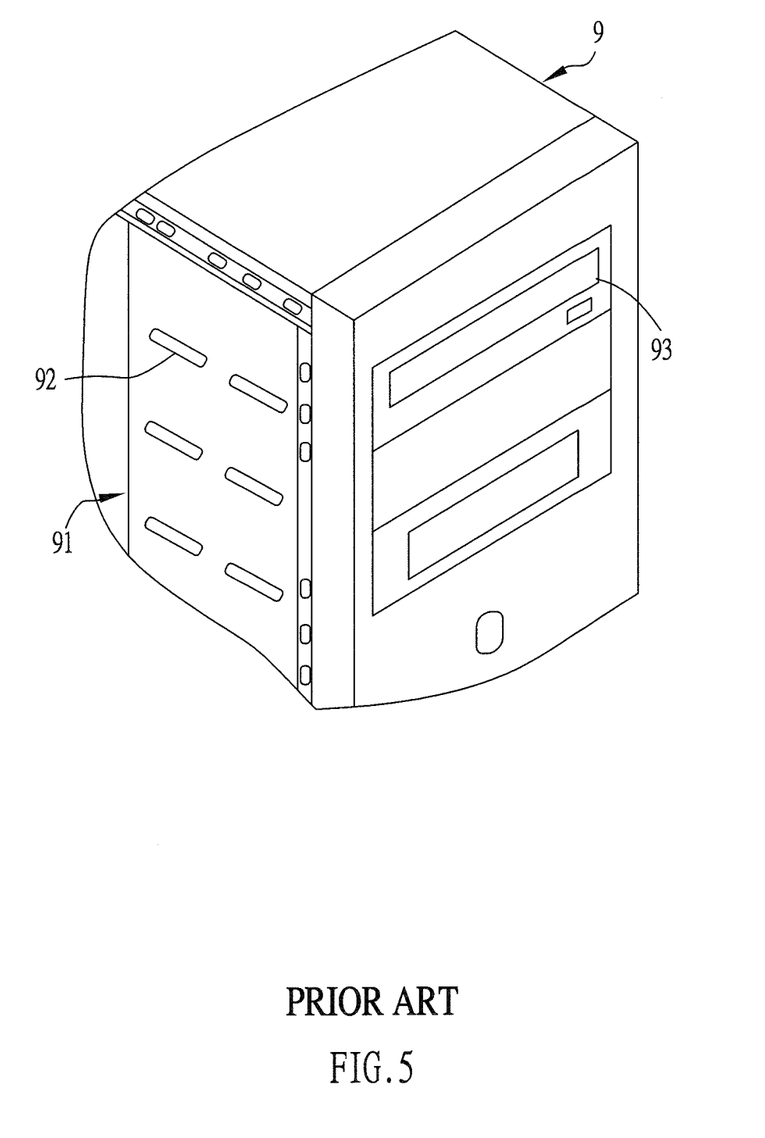
FIG. 5 is a schematic view illustrating the prior art.

Floppy disk drives or hard disk drives of the 3.5-inches standard or devices compatible thereto are still commonly available in the market. It is common that a user might still wish to use such a device. As shown in FIG. 5, a computer enclosure 9 comprises a main frame 91 mounted therein. The main frame 91 comprises a plurality of carrying structures 92 to respectively carry corresponding hardware 93 (such as an optic disc drive, a floppy disc drive, a card reader, a conventional hard disk drive (HDD), a solid-state drive, and the likes). The hardware 93 is often fixed in position by screwing. Further, it sometimes needs an additional adaptation rack to hold the hardware 93 in mounting the hardware 93 to the corresponding carrying structure 92. A common arrangement is that each carrying structure 92 is provided to correspond a specific piece of hardware 93 and in case that the number of carrying structures 92 is limited or the number of 2.5-inch devices to be installed is large, the overall expandability of the computer enclosure 9 would be greatly decreased. Further, screwing is generally time and labor consuming for operation of replacement. In addition, wear/abrasion of threaded holes may occur after frequent mounting/dismounting. As a result, overall convenience is poor.

SUMMARY OF THE INVENTION

The present invention provides a structure of a screw-free adaptation rack, which achieves the above object and overcome the drawbacks of the prior art. The features of the present invention reside in an integrally molded main casing, which comprises therein a carrying section that divides the interior space of the main casing into a primary accommodation space and a secondary accommodation space. The primary accommodation space is provided with a partition plate for being divided thereby into a first receiving space and a second receiving space. The main casing further comprises a retention mechanism arranged in the primary accommodation space. The retention mechanism comprises two resilient support sections, two operation sections, and a positioning member. Each of the operation sections comprises a blocking rim that is formed to incline in a direction from a rear side to a front side and a pressing section, which are used in combination with the resilient support sections and the positioning member to retain and fix at least one 2.5-inch hard drive having a thickness less than 9.5 millimeters in the primary accommodation space. Through pressing down the pressing sections to allow the resilient support sections to release restoration spring forces thereof, ejection of the hard drive can be achieved. The 2.5-inch hard drive mentioned above can be a solid-state drive (SSD) or a hard disk drive (HDD) and can be of various thicknesses, of which the commonly used are between 7 and 9.5 millimeter. Further, the secondary accommodation space further comprises two sidewalls on which a pair of bumps and a pair of through apertures are respectively formed to be opposite to each other. A retained object can be of two side surfaces each comprising a plurality of threaded holes formed therein. The plurality of threaded holes is selectively alignable with the through apertures to be fixed together with fastening means and the bumps are selectively insertable into the corresponding ones of the threaded holes to thereby fix the retained object.

Compared to the known techniques, the present invention takes advantage of an integrally molded main casing incorporating the above discussed features to allow the interior space of the main casing to readily receive and retain therein a 2.5-inch hard drive and allowing for extensive applications to various specifications so as to achieve mounting as desired by users through fixation in a screw-free manner.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

A preferred embodiment of the present invention will be described in detail with reference to the attached drawings. Referring to FIGS. 1-4, the present invention provides a structure of a screw-free adaptation rack, which comprises a main casing 1 made through injection molding. The main casing 1 comprises a carrying section 11 mounted therein. The carrying section 11 defines, in an upper side thereof, a primary accommodation space 2 and the carrying section 11 defines, in a lower side thereof, a secondary accommodation space 3. A partition plate 13 is arranged in the primary accommodation space 2 for division into a first receiving space 21 and a second receiving space 22. A holding section 14 is formed at a front end of the primary accommodation space 2. A stop plate 13 is arranged rearward of and substantially parallel to the carrying section 11. The stop plate 13 can be detached through a separation means from the rear side of the carrying section 11 so that the stop plate 13 can be then inserted into the holding section 14. The secondary accommodation space 3 further comprises two sidewalls 31 therein and each wall comprises a pair of bumps 33 and a pair of through apertures 32, each pair of which are arranged to correspond to each other. A retained object 34 can be one of a floppy disk drive 7, a card reader 5, a device having a size specification corresponding to a 3.5-inch floppy disk drive 7, and a 3.5-inch hard drive 6. The retained object 34 has two side surfaces in each of which a plurality of threaded holes 35 is formed. The plurality of threaded holes 35 are respectively alignable with the through apertures 32 to be fixed together with fastening means and the pair of bumps 33 are insertable into corresponding ones of the threaded holes 35 so as to fix the retained object 34 in position. A retention mechanism 23 is arranged in the primary accommodation space 2 for purposes of engaging and retaining. The retention mechanism 23 comprises two resilient support sections 24, two operation sections 25, and a positioning member 26. The resilient support sections 24 are each composed of an engagement face 241 in combination with a resilient member 242 to allow the resilient support section 24 to achieve position returning after being pressed down. The operation sections each comprise a pressing section 252 arranged inside the main casing 1 and a blocking rim 251 formed at a front end of the pressing section 252 in such a way that the blocking rim 251 takes a form of inclining from a rear side toward a front side. The positioning member 26 is arranged above the partition plate 12 and the positioning member 26 has two positioning sections 261 respectively extending into the first receiving space 21 and the second receiving space 22 so that with such a retention mechanism 23, at least one 2.5-inch hard drive 4 can be retained in the interior of the first receiving space 21 and the second receiving space 22.

Figure 1:
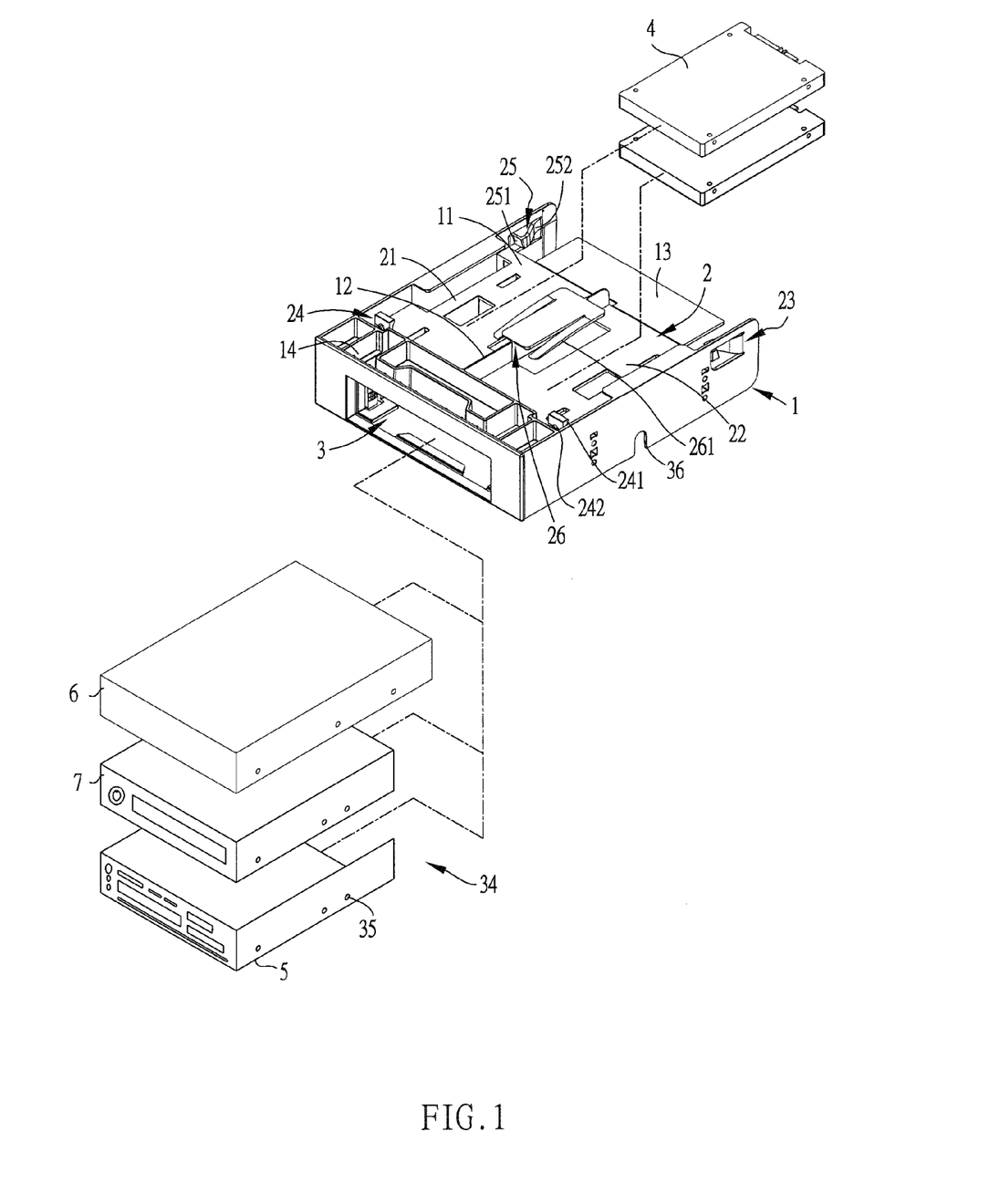
FIG. 1 is a perspective view showing the present invention.
Figure 2:
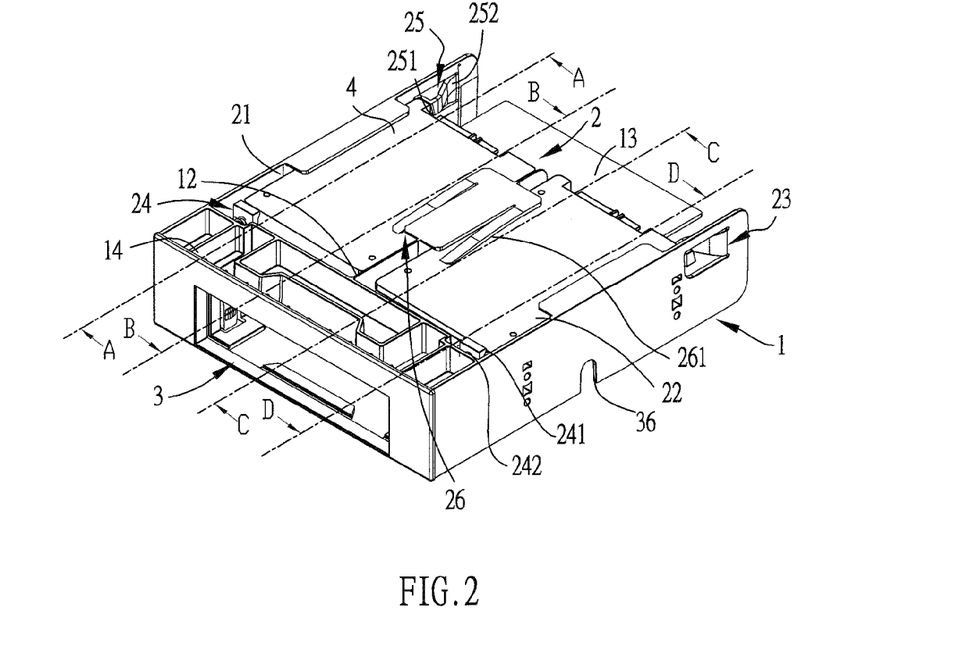
FIG. 2 is a perspective view of the present invention receiving a 2.5-inch hard drive therein.
Figure 2A:
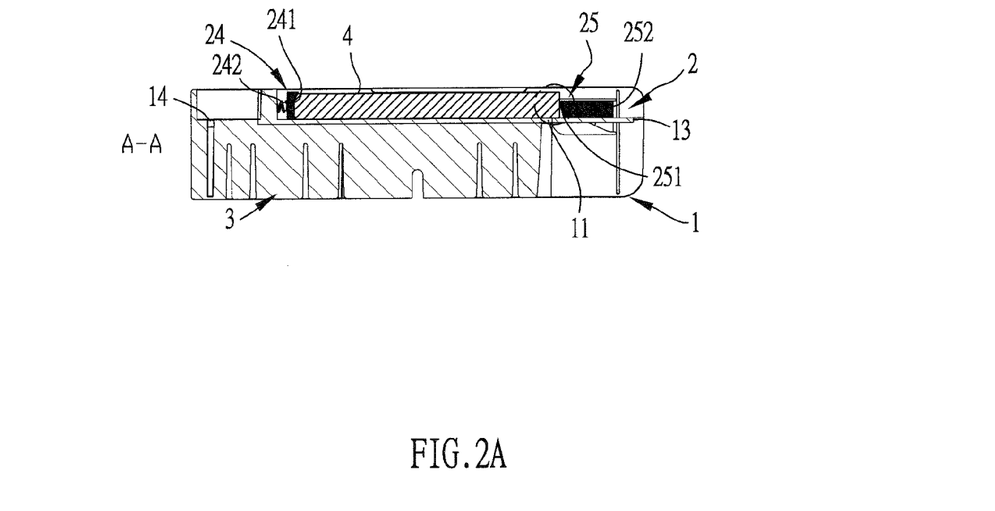
FIG. 2A is a cross-sectional view of the present invention receiving a 2.5-inch hard drive therein.
Figure 2B:
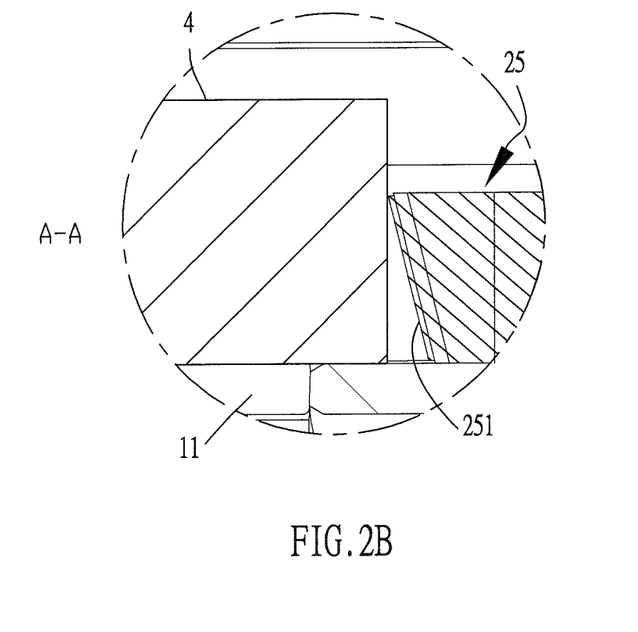
FIG. 2B is a cross-sectional view, in an enlarged form, of the present invent taken along line A-A.
Figure 2C:
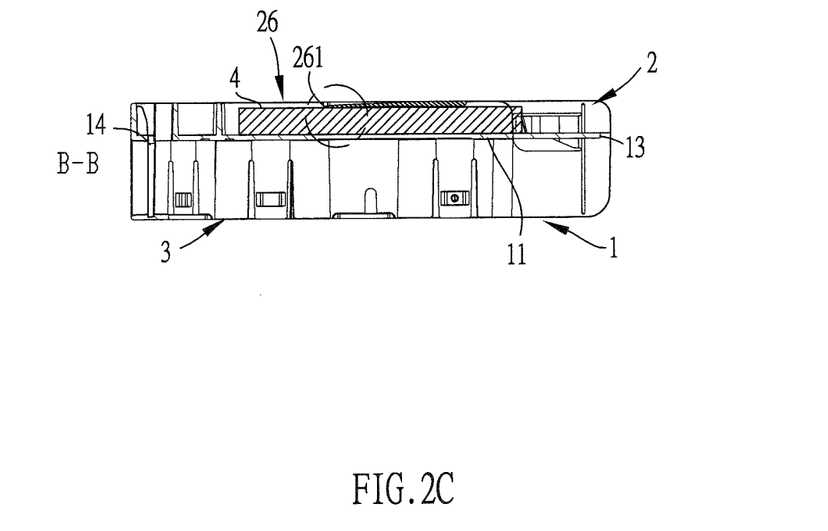
FIG. 2C is a cross-sectional view of the present invention receiving a 2.5-inch hard drive therein.
Figure 2D:
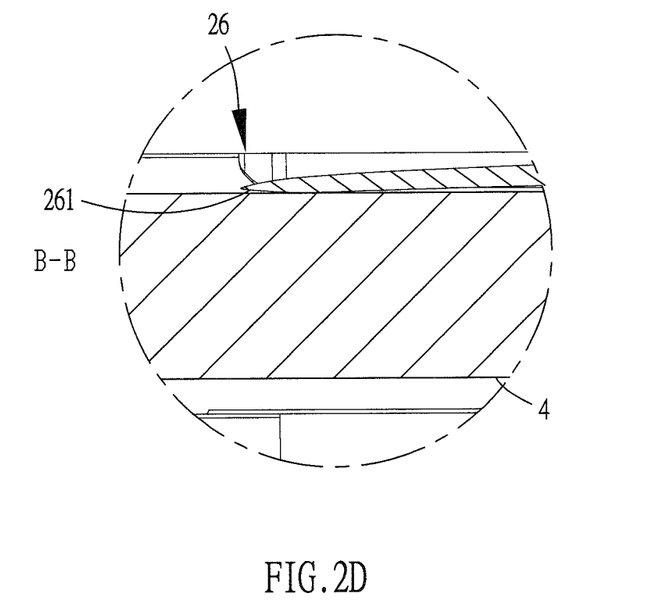
FIG. 2D is a cross-sectional view, in an enlarged form, of the present invent taken along line B-B.
Figure 2E:
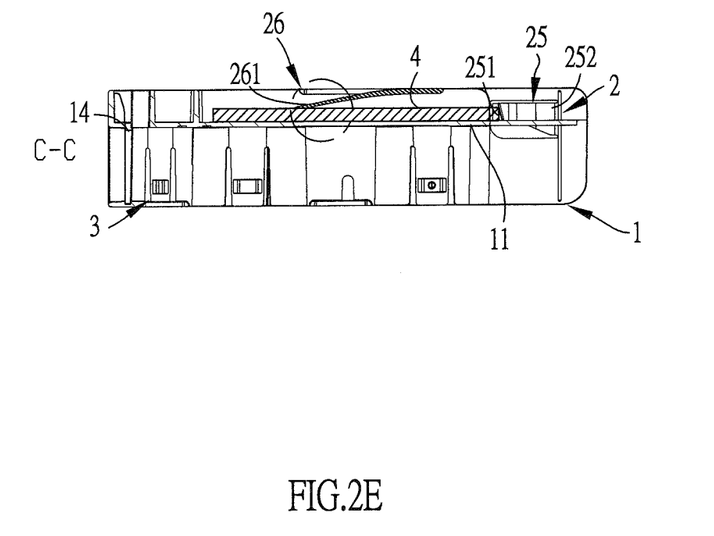
FIG. 2E is a cross-sectional view of the present invention receiving a 2.5-inch hard drive therein.
Figure 2F:
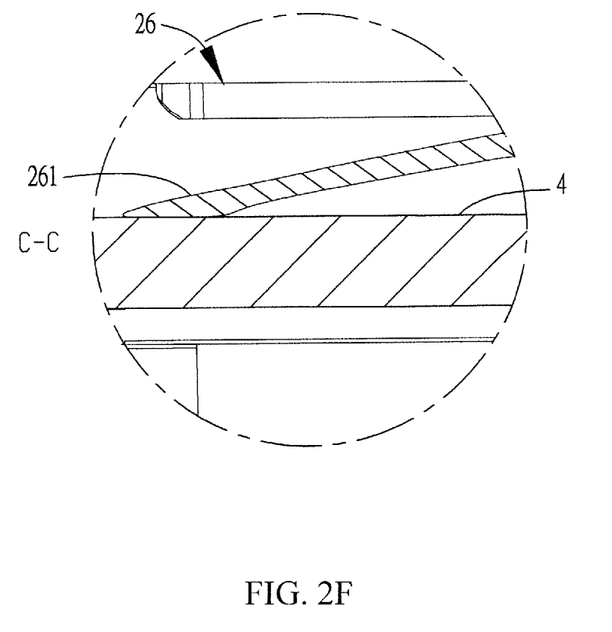
FIG. 2F is a cross-sectional view, in an enlarged form, of the present invent taken along line C-C.
Figure 2G:
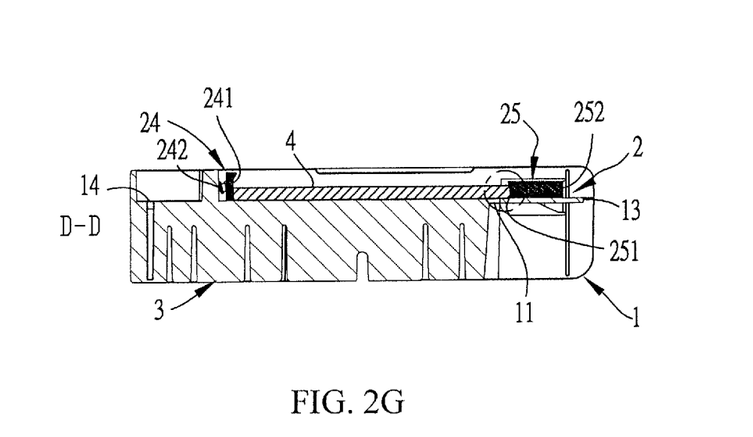
FIG. 2G is a cross-sectional view of the present invention receiving a 2.5-inch hard drive therein.
Figure 2H:
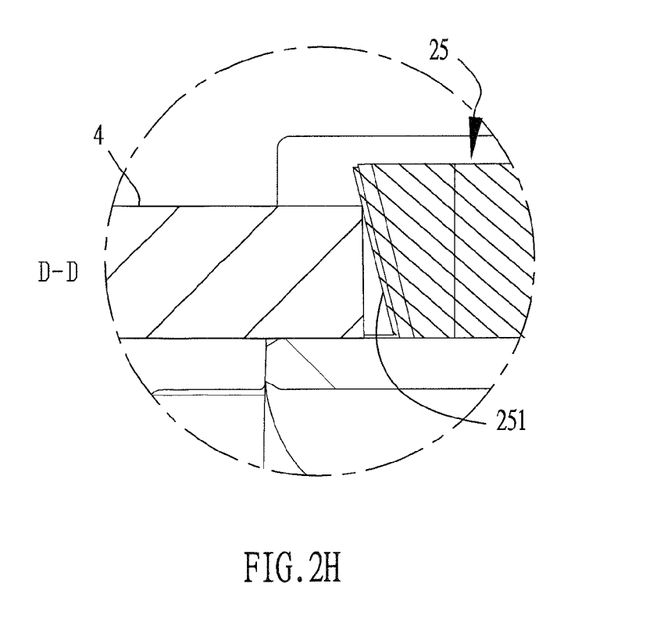
FIG. 2H is a cross-sectional view, in an enlarged form, of the present invent taken along line D-D.
Figure 2I:
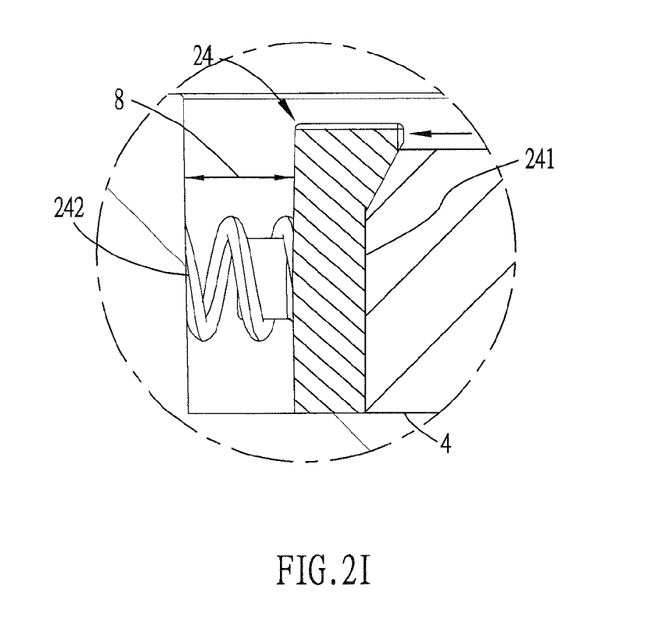
FIG. 2I is an enlarged view showing an operation of a resilient support section of the present invention in mounting a 2.5-inch hard drive.
Figure 2J:
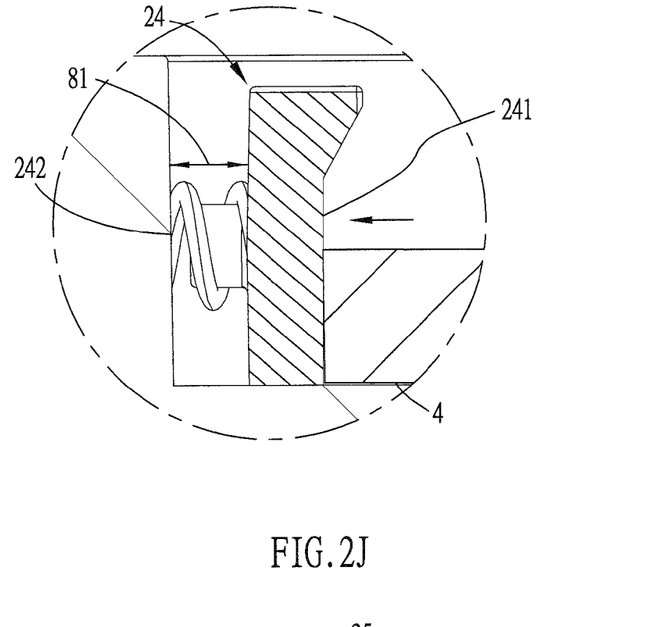
FIG. 2J is an enlarged view showing an operation of a resilient support section of the present invention in mounting a 2.5-inch hard drive.

Referring to FIGS. 1-2J, a 2.5-inch hard drive 4 can be a solid-state drive or a hard drive having different specifications of thickness of which the most common ones range between 7 and 9.5 millimeters. When the 2.5-inch hard drive 4 has a size that is thick and short, the topmost portion of the blocking rim 251 is in engagement with and supports the rear end of the 2.5-inch hard drive 4, while the front end of the 2.5-inch hard drive 4 is supported by the engagement faces 241 so that the resilient members 242 are each compressed to define a distance A8. The top of the 2.5-inch hard drive 4 is supported by the positioning sections 261 so as to have the 2.5-inch hard drive 4 completely fixed in position inside the first receiving space 2. When the 2.5-inch hard drive 4 received in the second receiving space 22 is of a size that is thin and long, the position where the blocking rim 251 engages and supports the rear end of the 2.5-inch hard drive 4 is close to and slightly above a center of the blocking rim 251 and the engagement face 241 that is acted upon by a spring force of the resilient member 242 that has been changed accordingly forms a distance B81 to support the front end of the hard drive 4 so as to fix the 2.5-inch hard drive 4 in the second receiving space 3, where the top of the 2.5-inch hard drive 4 is supported by the positioning sections 261 to thereby have the 2.5-inch hard drive 4 completely fixed in position inside the second receiving space 22. The distance A8 and the distance B81 that have been described above clearly reveal that the resilient members 242 are set according to the size of the 2.5-inch hard drive 4 received in the primary accommodation space 2 so that the spring restoration forces of the resilient members 242 are varied according to the specification of the 2.5-inch hard drive 4 received. This, together with adjustment made through the retention mechanism 23, can securely fix the 2.5-inch hard drive 4 in position.

Figure 3:
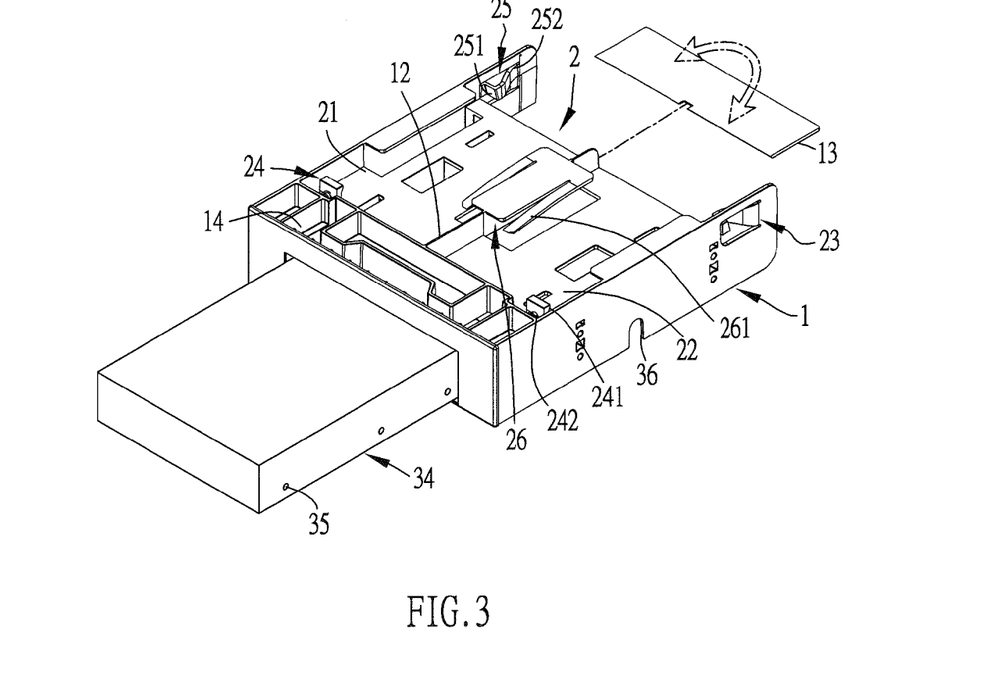
FIG. 3 is a schematic view illustrating the use of secondary accommodation space of the present invention.
Figure 3A:
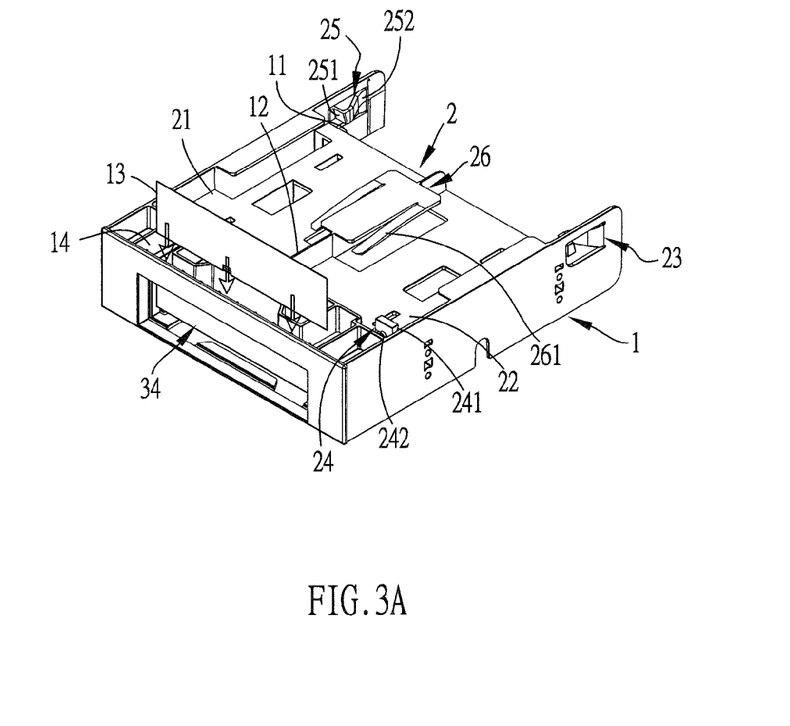
FIG. 3A is a schematic view illustrating the use of a stop plate of the present invention.
Figure 3B:
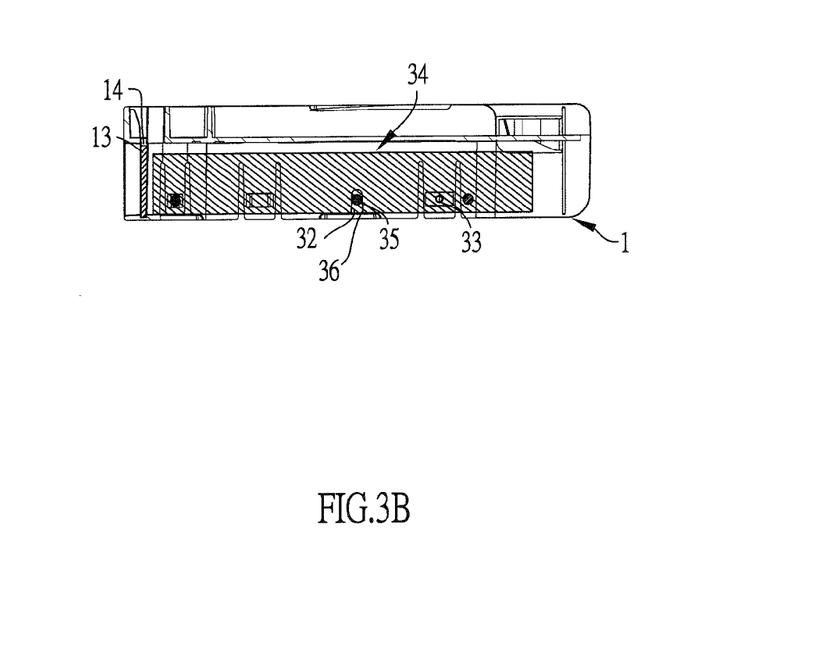
FIG. 3B is a schematic see-through view illustrating the secondary accommodation space of the present invention.
Figure 3C:
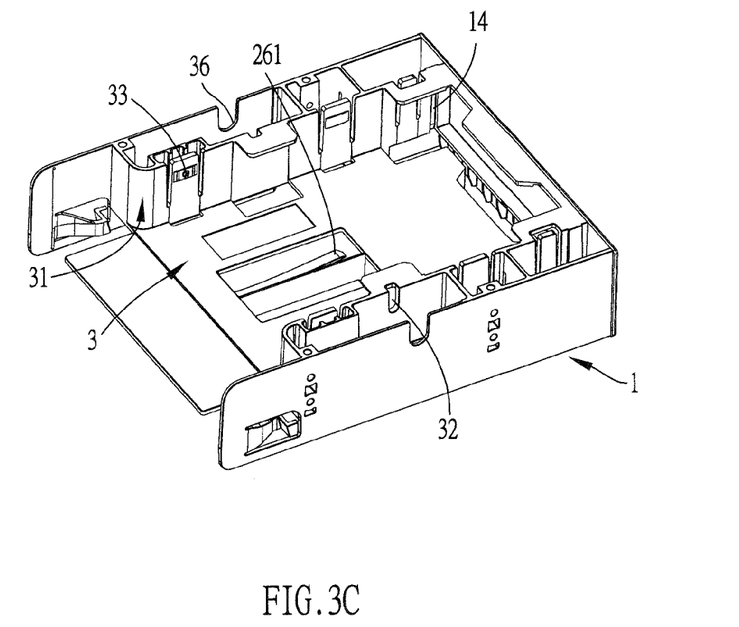
FIG. 3C is a perspective view of the present invention taken from a different side.
Figure 4:
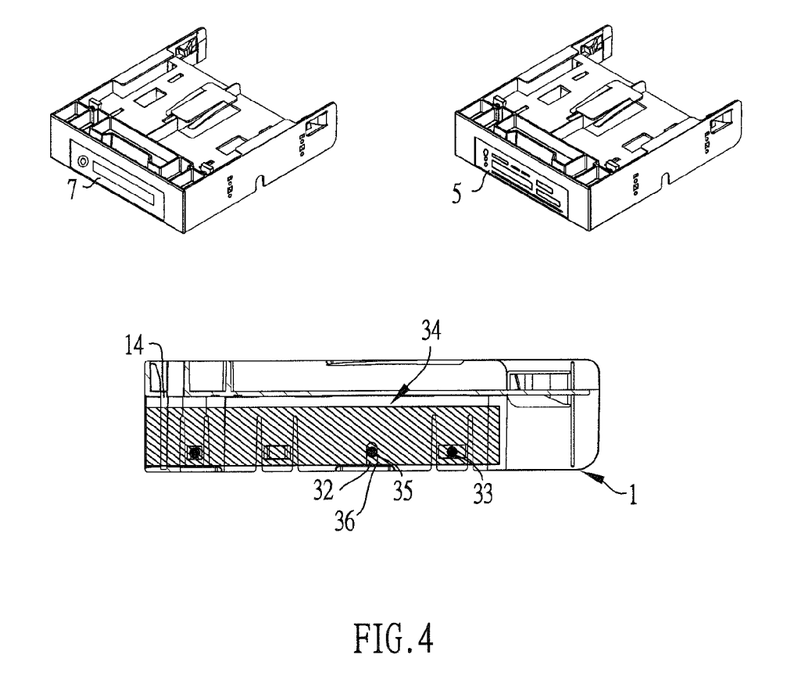
FIG. 4 is a schematic see-through view illustrating the secondary accommodation space of the present invention.

Referring to FIGS. 3 and 4, the secondary accommodation space 3 has two sidewalls 31 opposite to each other and the bumps 33 and through apertures 32 are arranged on the sidewalls 31 in opposite manner. When the retained object 34 is a 3.5-inch hard drive 6, the retained object 34 has two sides each comprising a plurality of threaded holes 35 that is roughly divided into front, middle, and rear sets, wherein the threaded holes 35 of the middle set are alignable to the through apertures 32 and fixing holes 36 and the threaded holes 35 are not alignable with the bumps 33 for fitting each other so that fixing is achieved through screwing of fasteners into the threaded holes 35 of the middle set of the 3.5-inch hard drive 6. However, under such a condition, the 3.5-inch hard drive 6 is spaced from the front end of the main casing 1 by a distance, making the 3.5-inch hard drive 6 visually incongruous and subjected to easy accumulation of dust and intrusion of foreign objects. Thus, the stop plate 13 that is arranged rearward of the carrying section 11 is detached by the separation means for being subsequently inserted into the holding section 14 to shield the exposed portions of the main casing 1 and the retained object 34 so as to make the overall appearance compact and aesthetic and prevent invasion of foreign objects.

The retained object 34 can be any one of a floppy disk drive 7, a card reader 5, and a device having a size specification corresponding to a 3.5-inch floppy disk drive 7. The retained object 34 has two side surfaces each comprising a plurality of threaded holes 35 that are roughly divided into front, middle, and rear sets. The distance between the middle and rear sets of the threaded holes 35 is relatively short, so that the threaded holes 35 of the middle set correspond respectively to the through apertures 32 and the fixing holes 36, while the threaded holes 35 of the rear set are respectively fit to the bumps 33 so as to securely fix the retained object 34 in the secondary accommodation space 3 in a screw-free manner. The threaded holes 35 of the middle set can be used, in combination with screws, to better fix the retained object 34. Thus, such an arrangement provides improved expandability to the retained object 34 received in the secondary accommodation space 3 and allows the present invention to mount a 2.5-inch hard drive in a screw-free manner with extensive applications to various devices.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a screw-free adaptation rack, comprising: a main casing, which is formed with injection molding, the main casing comprising a carrying section therein, the carrying section having an upper side defining a primary accommodation space, the carrying section having a lower side defining a secondary accommodation space;
a partition plate, which is arranged in the primary accommodation space for defining a first receiving space and a second receiving space; and
a retention mechanism, which is arranged in the primary accommodation space to serve as a retaining means;
wherein the retention mechanism further comprises: two resilient support sections, each of which comprises an engagement face in combination with a resilient member for driving restoration of the resilient support section after being compressed; two operation sections, each of which is arranged in a rear end of the primary accommodation space, each of the operation sections comprising a blocking rim and a pressing section, the pressing section being arranged inside the main casing, the blocking rim being formed at a front end of the pressing section and inclining in a direction from a rear side to a front side; and a positioning member, which is arranged above the partition plate and comprises two positioning sections respectively extending into the first receiving space and the second receiving space.

2. The structure of the screw-free adaptation rack according to claim 1, comprising: at least one 2.5-inch hard drive that is received in the primary accommodation space, the 2.5-inch hard drive having a front end engageable with the engagement face and a rear end engageable with the blocking rim so as to retain the 2.5-inch hard drive in the primary accommodation space, the positioning sections engageable with a top of the 2.5-inch hard drive to securely hold the 2.5-inch hard drive on the carrying section, whereby when the pressing sections are pressed down by external forces, the resilient support sections supply spring forces to eject the 2.5-inch hard drive out of the primary accommodation space.

3. The structure of the screw-free adaptation rack according to claim 2, wherein the 2.5-inch hard drive has a thickness between 7 and 9.5 millimeters.

\* \* \* \* \*